United States Patent
Kořista

(10) Patent No.: US 8,072,104 B2
(45) Date of Patent: Dec. 6, 2011

(54) COOLING OF A MAGNETIC BEARING

(75) Inventor: Milan Kořista, Brno (CZ)

(73) Assignee: Siemens Aktiengesellschaft, Munich (DE)

( * ) Notice: Subject to any disclaimer, the term of this patent is extended or adjusted under 35 U.S.C. 154(b) by 340 days.

(21) Appl. No.: 12/384,650

(22) Filed: Apr. 7, 2009

(65) Prior Publication Data

US 2009/0261673 A1    Oct. 22, 2009

(30) Foreign Application Priority Data

Apr. 16, 2008  (EP) .................................. 08007468

(51) Int. Cl.
 *H02K 7/09*    (2006.01)
(52) U.S. Cl. ..................................... 310/90.5
(58) Field of Classification Search ............... 310/90.5, 310/52–53, 55–64; 417/423.12; 384/317–321; H02K 7/09

See application file for complete search history.

(56) References Cited

U.S. PATENT DOCUMENTS

| | | | |
|---|---|---|---|
| 1,404,538 A | | 1/1922 | Mitchell |
| 2,173,489 A | * | 9/1939 | Voigt .............................. 384/320 |
| 3,800,174 A | * | 3/1974 | Butterfield et al. ............. 310/61 |
| 4,935,654 A | * | 6/1990 | Glass et al. ................... 310/90.5 |
| 5,398,571 A | | 3/1995 | Lewis |
| 5,588,754 A | * | 12/1996 | Miller ............................. 384/609 |
| 5,857,348 A | * | 1/1999 | Conry ............................. 62/209 |
| 6,149,405 A | * | 11/2000 | Abe et al. ...................... 417/420 |
| 6,913,390 B2 | * | 7/2005 | Inoue et al. .................... 384/476 |
| 2003/0030333 A1 | | 2/2003 | Johnsen |
| 2006/0175920 A1 | * | 8/2006 | Shimada ....................... 310/90.5 |

FOREIGN PATENT DOCUMENTS

| | | |
|---|---|---|
| DE | 102006004836 A1 | 5/2007 |
| EP | 1522749 A1 | 4/2005 |
| EP | 1717468 A1 | 11/2006 |
| FR | 340464 A | 7/1904 |
| GB | 16590 A | 0/1915 |

\* cited by examiner

*Primary Examiner* — Quyen Leung
*Assistant Examiner* — Naishadh Desai

(57) ABSTRACT

A rotary machine, which can be a turbine or a rotary compressor, is provided. The rotary machine includes a stationary housing and a rotating shaft supported in the housing by a magnetic bearing, whereby the magnetic bearing includes a laminated bearing journal with a shaft-mounted rotating lamination and a corresponding housing-mounted stationary lamination surrounding the rotating lamination, whereby both laminations extend axially to the shaft within a bearing portion, limited on one side by the end of the shaft. In addition, an axial duct extends axially through the shaft from the end to at least one substantially radial duct connecting the axial duct with an orifice in the shaft surface adjacent the other side of the bearing portion, and whereby a stationary tube is inserted in the axial duct supplying it with fluid. This arrangement provides sufficient cooling for a laminated bearing journal of the rotary machine.

12 Claims, 1 Drawing Sheet

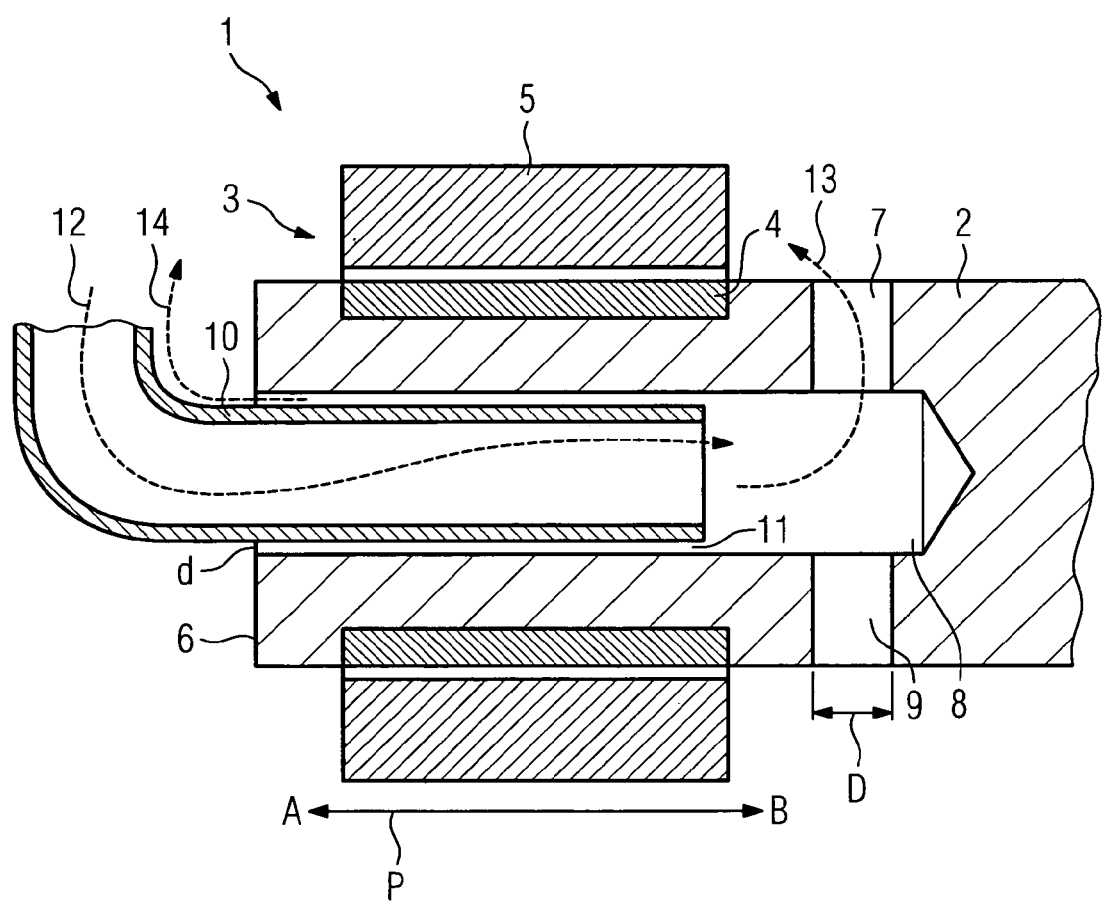

COOLING OF A MAGNETIC BEARING

CROSS REFERENCE TO RELATED APPLICATIONS

This application claims priority of European Patent Office application No. 08007468.5 EP filed Apr. 16, 2008, which is incorporated by reference herein in its entirety.

FIELD OF INVENTION

The present invention relates to a rotary machine, in particular to a turbine or a rotary compressor, comprising a stationary housing and a rotating shaft supported in said housing by a magnetic bearing, whereby said magnetic bearing comprises a magnetic bearing with a shaft-mounted rotating lamination and a corresponding housing-mounted stationary lamination surrounding said rotating lamination, whereby both laminations extending axially to the shaft within a bearing portion being limited on one side by the end of the shaft.

BACKGROUND OF INVENTION

A flywheel according to this constitution is disclosed in U.S. Pat. No. 5,398,571.

High-output rotary machines those mechanical components rotate at high revolution speeds—e.g. turbines or rotary compressors—are equipped with magnetic bearings to achieve less bearing friction and smooth running. For improvement of magnetic flux, bearing journals incorporated in magnetic bearings can be made up of a laminated construction. Heat induced in magnetic bearing has to be dissipated by appropriate cooling means to prevent lamination from thermal failure.

Aforesaid US-Patent does not provide any detailed information relating to means for cooling the rotating elements. Other solutions are not known.

SUMMARY OF INVENTION

It is an object of the present invention to provide appropriate means for cooling laminated bearing journal of a rotary machine as mentioned above.

A rotary machine according the present invention is characterized in that a axial duct is extending axially through the shaft from said end to at least one substantially radial duct connecting the axial duct with an orifice in the shaft surface adjacent the other side of said bearing portion, and whereby a stationary tube is inserted in said axial duct supplying it with fluid.

Cooling of the bearing journal according this invention is based on a gaseous and/or liquid coolant named fluid transported to the lamination to be cooled via the axial and the radial ducts in the shaft. The axial duct in the shaft is supplied with coolant from the stationary tube inserted into the axial duct. Due to rotation of the shaft, centrifugal forces affecting the coolant to leave the axial duct via the radial duct. Since the orifice of the radial duct in the shaft surface is situated close to the lamination, the fluid will stream along the bearing journal dissipating induced heat.

In a preferred embodiment the bearing journal is cooled by two streams of fluid exhausting from the shaft on both sides of the lamination. For this reason, a radial gap is provided between inserted stationary tube and axial duct, permitting fluid to exhaust from said end of the shaft.

Preferably, said orifice and/or said gap is opened to the atmosphere to permit outflow of the heated coolant.

A appropriate fluid can be air, water or a mixture of air with sprayed water.

BRIEF DESCRIPTION OF THE DRAWINGS

A preferred embodiment of the present invention may be explained by the following description to the enclosed FIGURE showing:

FIG. 1: Longitudinal section view on bearing journal.

DETAILED DESCRIPTION OF INVENTION

The rotating machine according to the shown embodiment is a axial turbine, e.g. a gas or steam turbine. Stationary housing of turbine is indicated on position 1. A shaft 2 is part of turbine's rotor supported revolvable in housing 1 by a magnetic bearing 3.

Magnetic bearing 3 comprises laminated bearing journal with a shaft-mounted rotating lamination 4 and a housing-mounted stationary lamination 5. Laminated components of magnetic bearing journals are well known in the art. Both laminations 4, 5 extending axially to the shaft 2 within a bearing portion B being limited on one side A by the end 6 of the shaft 2 and by a orifice 7 on the other side B.

A axial duct 8 is extending axially through shaft 2 from its end 6 to a radial duct 9. The axial duct 8 is arranged as a concentrically hole within the shaft 2. The radial duct 9 is arranged as a cylindrical boring throughout the shaft 2 crossing the axial duct 8 perpendicularly. The diameter of radial duct 9 is indicated with D. On the surface of shaft 2 radial duct 9 opens out in orifice 7.

A stationary tube 10 is inserted into the axial duct 8 from the end 6 of the shaft. The diameter of tube 10 is less than diameter of axial duct 8, therefore a radial gap 11 is formed between the wall of the 10 and die wall of the axial duct. The ring-shaped area of the gap 11 faced to the end 6 is indicated with d. Since tube 10 is introduced concentrically into axial duct 8, square measure of area d is constant.

In operation of turbine, axial duct 8 is supplied with fluid 12 by the tube 10. Fluid 12 is a matter of liquid and/or gaseous coolant, e.g. air, water or a mixture of air and sprayed water. Due to rotation of the shaft 2, a first stream 13 of fluid leaves the axial duct 8 via radial duct 9 and exhausts at orifice 7 adjacent to side B of the bearing portion P. A second stream 14 of fluid leaves the axial duct 8 via the gap 11. Therefore, the mass flow 12 from tube 10 is spitted into two streams 12, 13 according the dimensions d and D. Since gap 11 and orifice 7 are situated on both sides of bearing portion P, streams 13, 14 of coolant will stream along laminations 4, 5 from both sides A, B. On this way, a simple and efficient cooling of bearing journal is established.

The invention claimed is:

1. A rotary machine, comprising:
a stationary housing;
a magnetic bearing, further comprising a shaft-mounted rotating lamination and a corresponding housing-mounted stationary lamination surrounding the shaft-mounted rotating lamination;
a rotating shaft, supported in the stationary housing by the magnetic bearing; and
an axial duct which extends axially through the rotating shaft from an end of the rotating shaft to a substantially radial duct connecting the axial duct with an orifice in a rotating shaft surface adjacent to a first side of a bearing portion,
wherein both the shaft-mounted rotating lamination and the corresponding housing-mounted stationary lamination extend axially to the rotating shaft within the bearing portion which is limited on a second side by the end of the rotating shaft, and wherein a stationary tube is inserted in the axial duct and supplies the axial duct with a fluid.

2. The rotary machine as claimed in claim 1, wherein the rotary machine is a turbine.

3. The rotary machine as claimed in claim 1, wherein the rotary machine is a rotary compressor.

4. The rotary machine as claimed in claim 1, wherein the magnetic bearing is cooled by two streams of fluid exhausting from the rotating shaft on both the first and the second sides of the lamination via the axial duct and the radial duct in the rotating shaft.

5. The rotary machine as claimed in claim 1, wherein a radial gap is provided between the inserted stationary tube and the axial duct, permitting a stream of the fluid to exhaust from the end of the shaft.

6. The rotary machine as claimed in claim 5, wherein the radial gap is open to an atmosphere.

7. The rotary machine as claimed in claim 4, wherein a first stream of fluid leaves the axial duct via the radial duct at the orifice and a second stream of fluid leaves the axial duct via the radial gap.

8. The rotary machine as claimed in claim 1, wherein the orifice is open to an atmosphere.

9. The rotary machine as claimed in claim 5, wherein the fluid is a gaseous and/or a liquid coolant.

10. The rotary machine as claimed in claim 7, wherein the fluid is air.

11. The rotary machine as claimed in claim 7, wherein the fluid is water.

12. The rotary machine as claimed in claim 7, wherein the fluid is air sprayed with water.

* * * * *